(12) United States Patent
Kahlman

(10) Patent No.: US 7,852,238 B2
(45) Date of Patent: Dec. 14, 2010

(54) BALANCED DISPARITY FRAME SYNC

(75) Inventor: Josephus Arnoldus Henricus Maria Kahlman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1126 days.

(21) Appl. No.: 10/575,427

(22) PCT Filed: Oct. 7, 2004

(86) PCT No.: PCT/IB2004/052014

§ 371 (c)(1),
(2), (4) Date: Apr. 10, 2006

(87) PCT Pub. No.: WO2005/036551

PCT Pub. Date: Apr. 21, 2005

(65) Prior Publication Data

US 2007/0126610 A1 Jun. 7, 2007

(30) Foreign Application Priority Data

Oct. 13, 2003 (EP) .................................. 03103776

(51) Int. Cl.
*H03M 5/00* (2006.01)

(52) U.S. Cl. ............................ 341/58; 341/59; 341/68; 341/69; 375/355; 375/357; 375/368; 370/465; 370/508; 370/509

(58) Field of Classification Search .................. 341/58, 341/59, 68, 69; 375/355, 357, 368; 370/465, 370/508, 509
See application file for complete search history.

(56) References Cited

U.S. PATENT DOCUMENTS

| | | | | |
|---|---|---|---|---|
| 4,486,739 | A  * | 12/1984 | Franaszek et al. | 341/59 |
| 5,818,362 | A  * | 10/1998 | Walker | 341/57 |
| 5,892,466 | A  * | 4/1999 | Walker | 341/57 |
| 6,496,540 | B1 * | 12/2002 | Widmer | 375/242 |
| 6,496,541 | B1 | 12/2002 | Kahlman et al. | |
| 6,809,733 | B2 * | 10/2004 | Mukherjee et al. | 345/504 |
| 7,006,588 | B2 * | 2/2006 | Simmons et al. | 375/368 |
| 7,017,101 | B2 | 3/2006 | Ando et al. | |
| 7,177,520 | B2 * | 2/2007 | Zetts | 386/52 |
| 7,218,254 | B2 * | 5/2007 | Kahlman | 341/58 |
| 7,242,696 | B2 * | 7/2007 | Grundvig et al. | 370/510 |
| 7,580,347 | B2 * | 8/2009 | Geile et al. | 370/208 |
| 7,697,453 | B2 * | 4/2010 | Geile et al. | 370/252 |
| 7,701,978 | B2 * | 4/2010 | Kolze et al. | 370/503 |
| 7,707,475 | B2 * | 4/2010 | Hoyer | 714/752 |

(Continued)

FOREIGN PATENT DOCUMENTS

JP      11346154 A      12/1999

(Continued)

*Primary Examiner*—Linh V Nguyen

(57) ABSTRACT

A coder is fed with pre-coded data such that the absolute value of the RDS of the code words as produced by the coder is limited. This is achieved by ensuring that in a group of 2 code words the RDS of the first code word is compensated by the RDS of the second conde word. The RDS at the end of the second code word is then zero and the excursions of the RDS from the start of the first code word until the end of the second code word are limited because there are only a limited number of bits that can contribute to an increase of the absolute value of the RDS. This principle can easily be applied to the 17PP coder.

20 Claims, 9 Drawing Sheets

U.S. PATENT DOCUMENTS

2003/0174625 A1  9/2003  Okamura et al.

FOREIGN PATENT DOCUMENTS

| JP | 2002373472 A | 12/2002 |
| WO | 9900948 A1 | 1/1999 |
| WO | 2004001747 A2 | 12/2003 |

* cited by examiner

| IN | OUT |
|---|---|
| 00 | 1010 |
| 01 | 0001 |
| 10 | 0111 |
| 11 | 0101 |
| 1010 | 00001000 |

FIG.5

| IN | OUT |
|---|---|
| 1010 | 00 |
| 0001 | 01 |
| 0111 | 10 |
| 0101 | 11 |
| 00001000 | 1010 |

FIG.6

BALANCED DISPARITY FRAME SYNC

The invention relates to a method for coding a stream of M input words using a channel code, comprising the steps of
- selecting a frame sync extension from a group of frame sync extensions
- pre-coding the stream of M input words into a stream of pre-coded input words
- coding the stream of pre-coded input words into a stream of groups of N code words using a or parity inverting coder
- inserting a frame sync body directly in a fixed length frame in the stream of groups of N code words
- arranging for a group of code words representing the frame sync extension in the stream of groups of N code words directly adjacent to the inserted frame sync body where, after a further NRZI coding, a disparity of the frame sync body is balanced by a disparity of the group of code words representing the frame sync extension.

The invention further relates to a method of producing a record carrier on which a modulated signal obtained according to the previous method is recorded.

The invention also relates to a coding device for generating a channel code.

The invention further relates to a recording device in which such a coding device is used.

The invention still further relates to a signal

The invention further relates to a record carrier on which that signal is recorded.

The invention furthermore relates to a decoding device.

Finally, the invention relates to a reading device in which a record carrier of this type is used.

Such methods, such devices, such a record carrier and such a signal are known from WO 99/0948.

When data is transmitted through a transmission line or recorded onto a recording medium such as a magnetic disc, an optical disc or a magneto-optic disc, the data is modulated into code matching the transmission line or the recording medium prior to the transmission or recording. As a technique of modulation, block encoding is known. In the block encoding, a data string is blocked into units each comprising m×i bits. Each of the units which is referred to hereafter as a data word is then converted into a code word comprising n×i bits in conformity with a proper coding rule. For i=1, this code word is a fixed length code. In the case of i having a plurality of values each selected from the range 1 to imax, a maximum of i, the resulting code word is a variable length code. In general, a code resulting from the block encoding is expressed as a variable length code (d, k; m, n; r).

Here, i is called a constraint length and r is imax, a maximum constraint length. d is the minimum number of 0s appearing between two consecutive 1s. d is referred to as a minimum run of 0s. On the other hand, k is the maximum number of 0s appearing between two consecutive 1s. k is referred to as a maximum run of 0s.

By the way, in an operation to record variable length code obtained from the block encoding described above onto a recording medium such as an optical disc or a magneto-optic disc, for example, on to a compact disc (CD) or a minidisc (MD), the variable length code undergoes an NRZI (Non Return to Zero Inverted) modulation wherein each "1" of the variable length code is interpreted as inversion while a "0" is interpreted as non-inversion The variable length code completing the NRZI modulation is then recorded. The variable length code completing the NRZI modulation is referred to as a recording wave train. In the case of a magneto-optic disc conforming to the early ISO specifications prescribing a not so large recording density, a train of bits completing recording modulation are recorded as they are without undergoing the NRZI modulation.

Although the description of the background art in terms of groove position modulation, PIC band and an optical storage medium, the invention can equally be applied to other modulations and applications such as data communications where DC components are to be avoided in order to reduce interference with proper demodulation and/or tracking.

As described above, when data is transmitted through a transmission line or recorded onto a recording medium, the data is modulated into code matching the transmission line or the recording medium prior to the transmission or recording. If the code resulting from the modulation contains a direct current component, a variety of error signals such as tracking errors generated in control of a servo of the disc drive become prone to variations or jitters are generated easily. For this reason, it is thus desirable to make as many efforts to prevent the modulated code from containing a direct current component as possible.

In order to prevent the modulated code from containing a direct current component, control of a RDS (Running Digital Sum) to prevent the modulated code—from containing a direct current component has been proposed. The RDS is a total found by adding up the values of a train of bits (symbols of data), wherein the values +1 and −1 are assigned to "1" and "0" in the train respectively, which results from NRZI modulation (that is, level encoding) of a train of channel bits. The RDS is an indicator of a direct current component contained in a train of codes. Decreasing the absolute value of the RDS through RDS control is equivalent to suppressing the magnitude of a direct current component contained in a train of codes.

One method for controlling the RDS employs a pre-coder which inserts RDS control bits into the data stream before the data stream enters the coder.

RDS control is accomplished by calculating a RDS of a train of encoded bits (a train of channel bits) after the modulation for a predetermined period of time and inserting a predetermined number of RDS control bits into the train of encoded bits (the train of channel bits).

At any rate, the RDS control bits are basically redundant bits. If the efficiency of the code conversion is to be taken into consideration, it is thus desirable to reduce the number of RDS control bits to a smallest possible value.

In addition, if RDS control bits are inserted, it is also desirable to make the minimum run d and the maximum run k unchanged. This is because a change in (d, k) will have an effect on recording/playback characteristics.

PHQ 98023/WO 99/0948/EP application 99919490.5 addresses the problems described above by allowing RDS control to be executed for producing high efficiency control bits Much like the conventional method, after a data string is converted by using a conversion table RDS control can be executed by adding RDS control bits at predetermined intervals to a train of channel bits resulting from the conversion. By making use of the relation between the data string and the string of code words resulting from conversion based on a conversion table, the RDS control can be executed.

Insertion of RDS control bits having a value of "1" to indicate inversion and a value of "0" to indicate non-inversion into a train of channel bits is equivalent to insertion of RDS control bits having a value of "1" to indicate inversion and a value of "0" to indicate non-inversion into a train of data bits.

Thus, inserting bits in the data stream before the coder allows control of the RDS of the stream of code words after the coder.

If the data rate used in a section of a storage medium is reduced it is more likely that the modulated data will have DC components. An example of a section of a storage medium where the data rate is reduced is the Program Information and Calibration area, the PIC band, on an optical disc. Here pre-recorded information is stored using for instance HFM grooves. The data in this area is recovered in that the grooves are being tracked by the tracking system and deviations from the expected course of the groove represent the data modulated onto the groove. It is important to ensure the minimum amount of DC in the data modulated onto the groove in order to be able to recover the data reliably.

The method of DC control where bits are inserted into the bit stream before the coder at pre-determined intervals has the drawback that between the inserted RDS control bits the RDS value can vary and deviate considerably from zero, thus not assuring the lowest possible RDS as required by tracking system in the PIC band. Also because the data rate in the PIC band is lower than the data rate outside the PIC band the modulated date in the PIC band can easily interfere with the DC control causing problems in the tracking of the groove.

Another solution that allows the improved control of the DC content is by pre-coding such that the absolute value of the RDS returns to zero every N code words the excursions of the absolute value of the RDS are automatically kept small since there are only N code words in which the absolute value of the RDS can increase and deviate more and more from zero.

Since the excursions of the RDS are kept very small locally the overall variations of the RDS will also remain very small. Since the local excursions of the RDS are small and of short duration, limited by the choice of N, the modulated signal will have a very low DC component. For optical and magnetic storage media this means that the tracking will be affected only minimally by the presence of modulated data on the track.

Especially when N=2 the DC control is very effective because after 2 code words the RDS will return to zero and the excursions of the RDS are thus strictly limited. The DC content of the code words is thus reduced but in addition to the code words the channel data stream comprising the code words also comprises frame syncs. The frame syncs indicate the start of a fixed length frame. The frame sync comprises a frame sync body and a frame sync extension. The frame sync, being part of the channel data stream, contributes to the overall DC of the data stream.

If the channel data rate used in a section of a storage medium is reduced, it is more likely that the modulated channel data stream will have DC components. An example of a section of a storage medium where the data rate is reduced is the Program Information and Calibration area, the PIC band, on an optical disc. Here pre-recorded information is stored using for instance HFM grooves. The data in this area is recovered in that the grooves are being tracked by the tracking system and deviations from the expected course of the groove represent the data modulated onto the groove. It is important to ensure the minimum amount of DC in the data modulated onto the groove in order to be able to recover the data reliably.

The frame sync has the disadvantage that it introduces unwanted DC content. This disadvantage can be overcome by ensuring that the DC contribution of the frame sync body is cancelled by the frame sync extension. This has however the disadvantage that in the fixed length frame valuable space is lost for the user data It is an object of the present invention to optimize the space in the fixed length frame while at the same time maintain the DC content reduction provided by the cancellation of the DC contribution of the frame sync body by the frame sync extension.

In order to achieve this objective the present invention is characterised in that a length of the group of code words representing the frame sync extension is variable.

In a frame with a fixed length a variable length of the group of code words in the channel data stream representing the frame sync allows the reduction of the number of bits of the group of code words representing the frame sync extension, allowing more user data bits to be stored in a frame with the same frame length.

Instead of selecting frame sync extensions with a constant number of bits in the code words representing the frame sync extensions, frame sync extensions can be selected that allow the cancellation of the DC contribution of the frame sync body using fewer bits.

A further embodiment of the present invention is characterized in that the coder is a 17PP coder.

Using a parity preserving 17PP coder allows the selection of frame sync extensions that result in channel code words that cancel, i.e. balance, the contribution to the RDS, and thus the DC contribution, of the frame sync body in the channel data stream. A complete description of 17PP coding can be found in U.S. Pat. No. 6,496,541.

Since the pre-coder together with the 17PP coder ensure the suppression of DC content in the user data code words, the overall channel data stream, comprising the user data code words with no DC content and the frame sync with a no DC content, has no DC content.

A further embodiment of the method is characterized in that the coder is an EFM coder.

An EFM coder allows DC control for the code words obtained from user data. The frame syncs inserted into the stream of code words exhibit the same problem as described above for the 17PP coder. The present invention can consequently be equally well used to balance the disparity of the frame sync in a stream of code words where the code words are coded using an EFM coder. The EFM code is used on the compact disc known as CD.

A further embodiment of the method is characterized in that the coder is an EFM+ coder.

An EFM+ coder allows DC control for the code words obtained from user data. The frame syncs inserted into the stream of code words exhibit the same problem as described above for the 17PP coder. The present invention can consequently be equally well used to balance the disparity of the frame sync in a stream of code words where the code words are coded using an EFM+ coder. The EFM+ code is used on the Digital Versitile Disc, known as DVD.

A further embodiment of the invention is characterized in that the step of arranging for the group of code words representing the frame sync extension in the stream of groups of N code words comprises the step of inserting a frame sync extension input word into the stream of M input words.

Because the frame sync body must be distinguishable from the user data code words the frame sync body is chosen to be a combination of bits that cannot occur when encoding user data using the 17PP coder. A combination that violates the code constraints of the 17PP coder fill fills this requirement for a frame sync body. The frame sync body must consequently be inserted into the code words generated by the 17PP coder and cannot generated by inserting certain input words into the stream of input words.

In contrast to this, the code words representing the frame sync extension can be generated by inserting frame sync input words into the 17PP coder that result in the appropriate code words representing the frame sync extension at the output of the 17PP coder. The code words representing the frame sync extension thus comply with the 17PP code constraints.

This is advantageous for the transmission through the channel, i.e. the recording and playback of the record carrier.

Because the 17PP coder is parity preserving the frame sync extension input words will, after coding by the 17PP coder, result in code words with the same parity. Since the parity of the code words contribute to the disparity of the channel code words, i.e. the code words after NRZI encoding, the 17PP coder allows excellent control over the disparity of the channel code words representing the frame sync extension.

A further embodiment of the invention is characterized in that the step of arranging for the group of code words representing the frame sync extension in the stream of groups of N code words comprises the step of inserting code word representing the frame sync extension into the stream of groups of N code words.

Instead of inserting input words into the input stream, i.e. having the code words representing the frame sync extension generated by the 17PP coder, the code words representing the frame sync extension can also be inserted into the stream of code words as generated by the 17PP coder, i.e. inserted together with the frame sync body. This has the advantage of using the same means for the insertion of the code words representing the frame sync extension as for the insertion of the frame sync body. Furthermore it removes the need to coordinate the insertion of the input words for the frame sync extension with the insertion of the frame sync body in order to ensure that the frame sync body is inserted exactly before the code words representing the frame sync extension in the stream of code words coming from the 17PP coder.

A further embodiment of the invention is characterized in that the group of code words representing the frame sync extension in the stream of groups of N code words is chosen from the following table:

|  | Frame Sync extension |
| --- | --- |
| FS0 | 000 001 1110 1011 |
| FS1 | 010 010 1011 1010 |
| FS2 | 101 000 1011 1111 |
| FS3 | 100 001 1101 1010 |
| FS4 | 000 100 0011 1010 |
| FS5 | 001 001 1011 1110 |
| FS6 | 010 000 1011 0101 |
| FS7 | 100 101 |
| FS8 | 101 010 |

The code words representing the frame sync extension are denoted FS0 through FS8 in the above table. When effectively appended to the frame sync body a frame sync results that, when encoded in the NRZI format, has a disparity of exactly 0. Because for the frame sync extension FS7 and FS8 the code words representing the frame sync extension comprise less bits than the frame sync extensions FS0 through FS6, more space in the fixed length frame is available for code words representing user data when the frame sync has frame sync extension FS7 or FS8 compared to when the frame sync has frame sync extension FS0 through FS6. As a result in 25% of the frames more user data can be stored, leading to an increased capacity of the recording medium or the transmission channel.

The 17PP coder is normally used for coding the data outside the PIC band and produces unacceptable interference with the tracking in the PIC band. The DC control as provided by the present invention enables the use of the 17PP coder for coding both the data outside the PIC band and within the PIC band. This has the advantage that it is no longer necessary to have two different coders for the two areas, thus reducing the complexity of the apparatus using the method according to the invention.

Also it is no longer required to have two different decoders when decoding the retrieved data because one 17PP coder can decode both the data outside the PIC band and within the PIC band.

A further advantage of this embodiment is that the d, k and RMTR constraints of the code are maintained since the standard 17PP coder is used to encode the pre-coded input words.

A further embodiment of the invention is characterized in that a first sub group of the group of code words representing the frame sync sub ID in the stream of groups of N code words is chosen from the following table:

|  | Frame Sync sub ID |
| --- | --- |
| FS0 | 000 001 |
| FS1 | 010 010 |
| FS2 | 101 000 |
| FS3 | 100 001 |
| FS4 | 000 100 |
| FS5 | 001 001 |
| FS6 | 010 000 |
| FS7 | 100 101 |
| FS8 | 101 010 | and that a second sub group of the group of code words is generated using the 17PPcoder by providing to the 17PP coder a corresponding group of frame sync input words in the stream of pre-coded input words which are chosen from the following table:

|  | frame sync input word |
| --- | --- |
| FS0 | 11 10 10 11 |
| FS1 | 10 11 10 10 |
| FS2 | 10 11 11 11 |
| FS3 | 11 01 10 10 |
| FS4 | 00 11 10 10 |
| FS5 | 10 11 11 10 |
| FS6 | 10 11 01 01 |
| FS7 | none |
| FS8 | none |

The group of code words representing the frame sync extension is split into a first sub group of code words that is directly inserted into the stream of code words, in the same way as the frame sync body, and second sub group of code words obtained by inserting a group of frame sync input words in the stream of pre-coded input words. When a coder is already arranged for inserting the frame sync body and the first sub group of code words representing the frame sync extension into the stream of code words, modifications of the coder can be avoided by adding the second sub group of the group of code words representing the frame sync extension via the input of the coder.

It should be noted that pre-coding can only affect the data as produced by the coder. If the coder inserts other elements into the encoded data stream, for instance a frame sync, pre-coding cannot change the RDS of the frame sync.

For this reason the group of frame sync input words is added to the data stream after the pre-coder, i.e. between the output of the pre-coder and the input of the 17PP coder.

In order to overcome this problem the RDS of the frame sync can be compensated by data directly following the sync pattern if the coder is aware of the location in the encoded data stream of the data that is being coded as it can thus arrange that the group of frame sync input words result in a second sub group of the group of code words representing the frame sync extension at exactly the right location in the stream of code words, i.e. directly behind the inserted first sub group of the group of code words representing the frame sync extension, so that the first sub group and the second sub group are joined and together represent the frame sync extension. The addition of the group of frame sync input words leads to a small loss of data storage capacity but ensures that at the end of the code words representing the frame sync extension the disparity and thus the RDS and thus the DC content of the frame sync is zero.

The invention will now be discussed based on figures.

Throughout the description the abbreviation 'FS' stand for 'frame sync'. Thus 'FS ID' means 'frame sync ID' i.e. 'frame sync IDdentification', 'FS body' stand for 'frame sync body' and 'FS balancing word' stands for 'frame sync balancing word'. In addition the various frame sync IDs are assigned a label for clarity: FS0 through FS8 representing 'frame sync ID 0' through 'frame sync ID 8' respectively.

FIG. 5 shows the table used by the pre-coder to pre code the data.

FIG. 6 shows the table used by the decoder

FIG. 1 shows an encoding system using the pre-coder.

Figure 1:
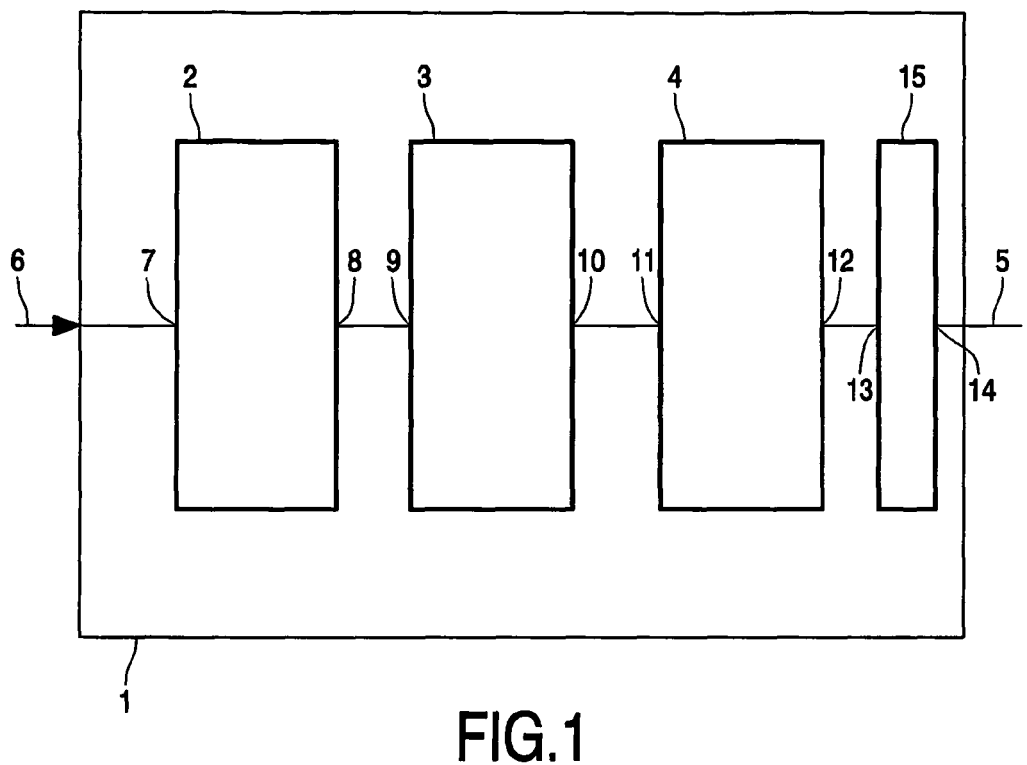
FIG. 1 shows a system using the pre-coder

The encoding system 1 receives data to be encoded on the input 6. The input 6 is connected to the input 7 of the error correction encoder 2. The error correction encoder 2 is included in order to show the location of the pre-coder 3 in a typical encoding system 1 but is not essential to the invention.

The data comprising the error correction is then provided by the error correction encoder 2 via its output 8 to the input 9 of the pre-coder 3. The pre-coder then pre-codes the data comprising the error correction and provides the pre-coded data via its output 10 to the input 11 of the coder 4. The coder 4 encodes the pre-coded data and provides the resulting code words via its output 12 to the input 13 of the NRZI encoder 15. The NRZI encoder 15 provides the NRZI encoded code words via its output 14 to the output 5 of the encoding system 1.

The pre-coding performed by the pre-coder 3 is closely linked to the encoding performed by the coder 4 since the pre-coding targets characteristics of the code words as produced by the coder 4. The coder type used throughout the discussion of the figures is a 17PP coder.

The coder 4 is fed with pre-coded data such that the absolute value of the RDS of the code words as produced by the coder 4 is limited. This is achieved by ensuring that in a group of 2 code words the RDS of the first code word is compensated by the RDS of the second code word. The RDS at the end of the second code word is then zero and the excursions of the RDS from the start of the first code word until the end of the second code word are limited because there are only a limited number of bits that can contribute to an increase of the absolute value of the RDS.

The coder 4 can be for instance a 17PP coder.

Figure 2:
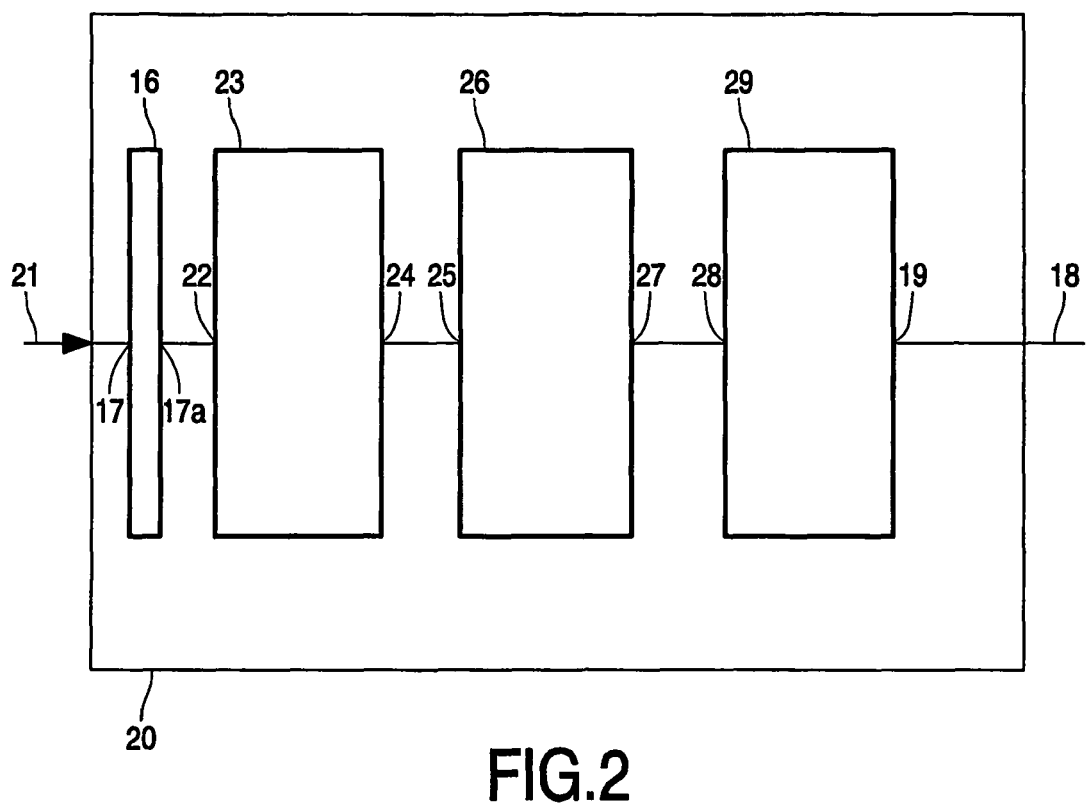
FIG. 2 shows a receiver according to the invention

FIG. 2 shows a decoding system for retrieving the original data

The decoding system 20 receives the NRZI encoded code words at its input 21 and provides the NRZI encoded received code words to the input 17 of the NRZI decoder 16. The NRZI decoder 16 removes the NRZI code and provides the code words thus obtained via its output 17a to the input 22 of the decoder 23. The decoder 23 decodes the code words and thus retrieves the pre-coded data comprising error correction and provides this data via its output 24 to the input 25 of the pre-code decoder 26. The pre-code decoder 26 decodes the data received from the decoder 23 and provides the pre-code decoded data via its output 27 to the input 28 of the error correction decoder 29. The error correction decoder 29 removes the error correction coding from the pre-code decoded data and performs the associated error correction. The error correction decoder then provides the resulting data via its output 19 to the output 18 of the decoding system 20. The resulting data corresponds to the input data as provided to the encoding system 1. The decoder 23 can be for instance a 17PP decoder.

Figure 3:
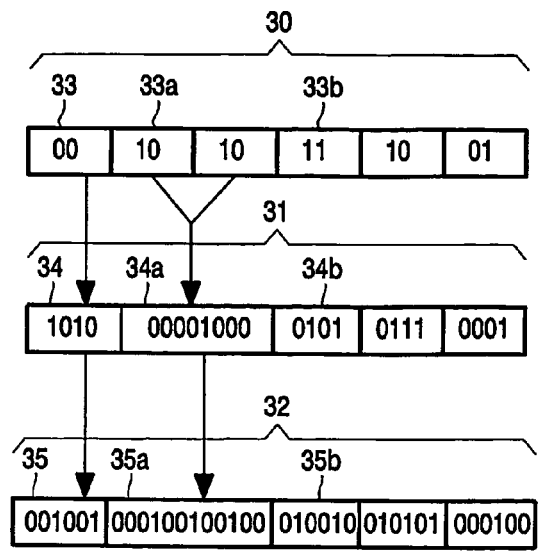
FIG. 3 shows an example encoding of input words

FIG. 3 shows an example encoding of input words

The pre-coding step used in this example uses the following table:

| In | Out |
|---|---|
| 00 | 1010 |
| 01 | 0001 |
| 10 | 0111 |
| 11 | 0101 |
| 1010 | 00001000 |

The stream 30 of input words comprises error correction coded input words 33, 33a, 33b.

This stream 30 is pre-coded into a stream 31 of pre-coded input words 34, 34a, 34b.

The stream 31 of pre-coded input words gets coded by the coder into a stream 32 of code words 35, 35a, 35b.

The input word 33 with value '00' results in the pre-coded input word 34 with value '1010'.

The pre-coded input word 34 is subsequently coded by the 17PP coder into the code word 35 with a value of '001 001'.

When the pre-coder encounters a sequence of two input words 33a in the stream of input words 30 with a value of '1010' it pre-codes these two input words 33a into a sequence of two pre-coded input words 34a with the value '0000 1000'.

The coder subsequently codes the sequence of two pre-coded input words 34a into a sequence of two code words 35a with a value of '000 100 100 100'.

It is evident that because the 17PP coder processes the pre-coded input words, the resulting output words will always comply with the 17PP channel code constraints. The resulting code words can therefore be decoded using a standard 17PP decoder, after which only the preceding is to be removed before the error correction coding is removed in order to yield the original input words as were present in the original stream 30 of input words.

Figure 4:
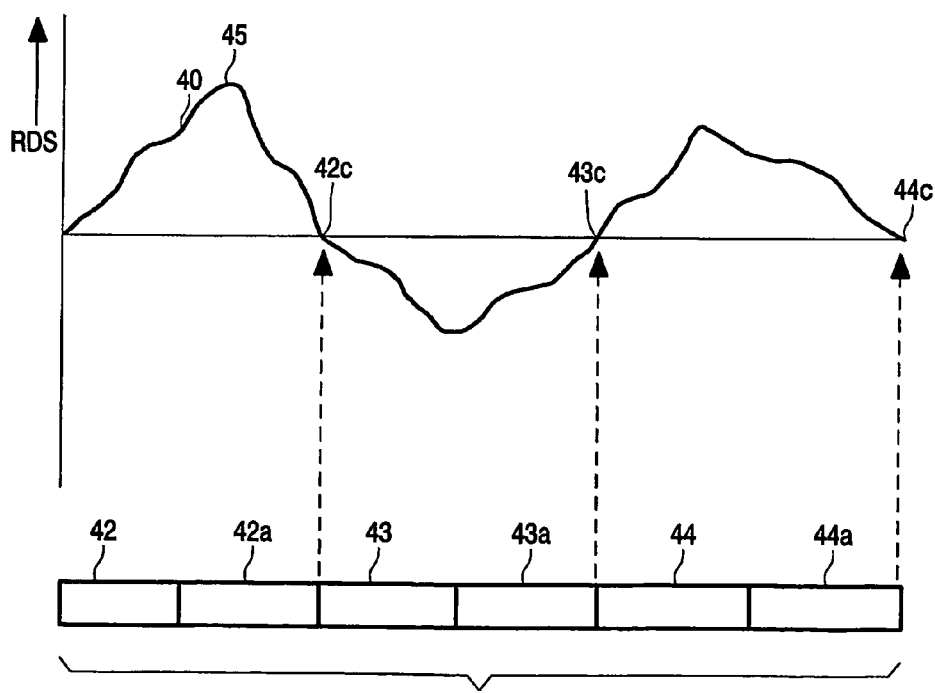
FIG. 4 shows the RDS of a signal according to the invention

FIG. 4 shows the RDS of a signal according to the invention

The example graph shows RDS versus the code words 42, 42a, 43, 43a, 44, 44a.

A group of 2 code words is the first code word 42 and the second code word 42a.

Another group of 2 code words is the third code word 43 and the fourth code word 43a. As can be seen the pre-coder will ensure that the total RDS for the two code words 42, 42a, 43, 43a, 44, 44a in a group is zero. This is indicated by a zero crossing 42c, 43c, 44c of the graph 40 representing the RDS.

Because the RDS can only increase during at most part of the two code words, during the other part the RDS must return to zero, the maximum of the absolute value of RDS is also limited. Also the duration during which the RDS is not zero is limited to a maximum of 2 code words. This way the overall absolute value of the RDS is kept under tight control and reduced in most situation compared to other methods of DC control to limit the absolute value of the RDS.

FIG. 5 shows the table used by the pre-coder to pre code the data.

The pre-coder searches the stream of error correction coded input words for matches with the elements in the 'in' column of the table in FIG. 5. When a match is found the bits in the stream of error correction coded input words that match are replaced by the bits of the corresponding element in the 'out' column of the table in FIG. 5.

For examples when a '00' is encountered these bits are replaced by the bits 1010.

The bitrate is doubled effectively shifting the spectral content of the code words to a higher frequency, while at the same time the elements of the 'out' column are such that, when coded by a 17PP coder, the running digital sum of each group of N code words equals zero.

FIG. 6 shows the table used by the pre-code decoder.

The decoder that removes the pre-coding from the 17PP decoded code words uses the table shown in FIG. 6. Using the table of FIG. 6 the decoder performs the inverse operation of the pre-coding. After removing the pre-coding the resulting stream corresponds to the stream of error correction encoded input words in the encoder.

The search and replace operation of the decoder to remove the pre-coding is similar to the search and replace operation of the pre-coder, except that the table in FIG. 6 instead of the table in FIG. 5 is used.

Figure 7:
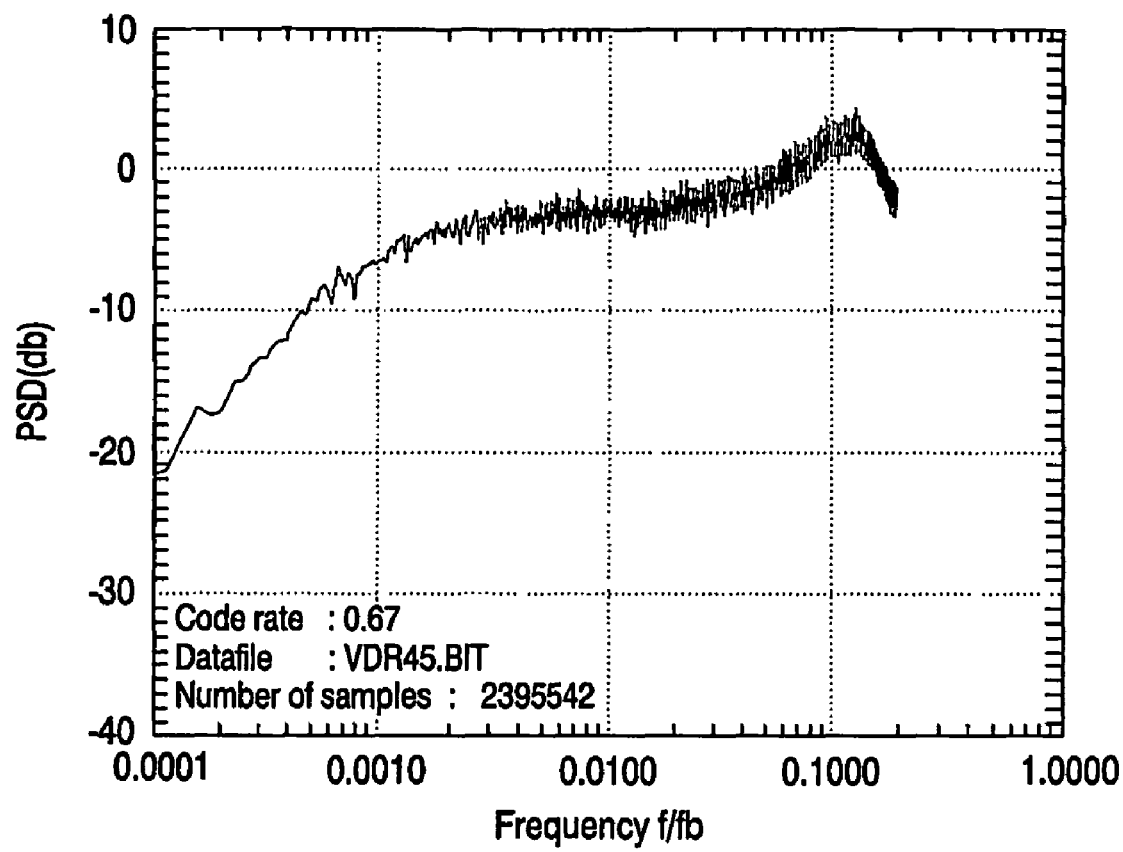
FIG. 7 shows the spectral content of the code words when using a 17PP coder

FIG. 7 shows the power spectral density of the code words when using a 17PP coder The spectrum has some DC content and increases from this level with frequency to a maximum. The curve of the power spectral density is a direct consequence of the characteristics of the code words as produced by the 17PP coder.

Figure 8:
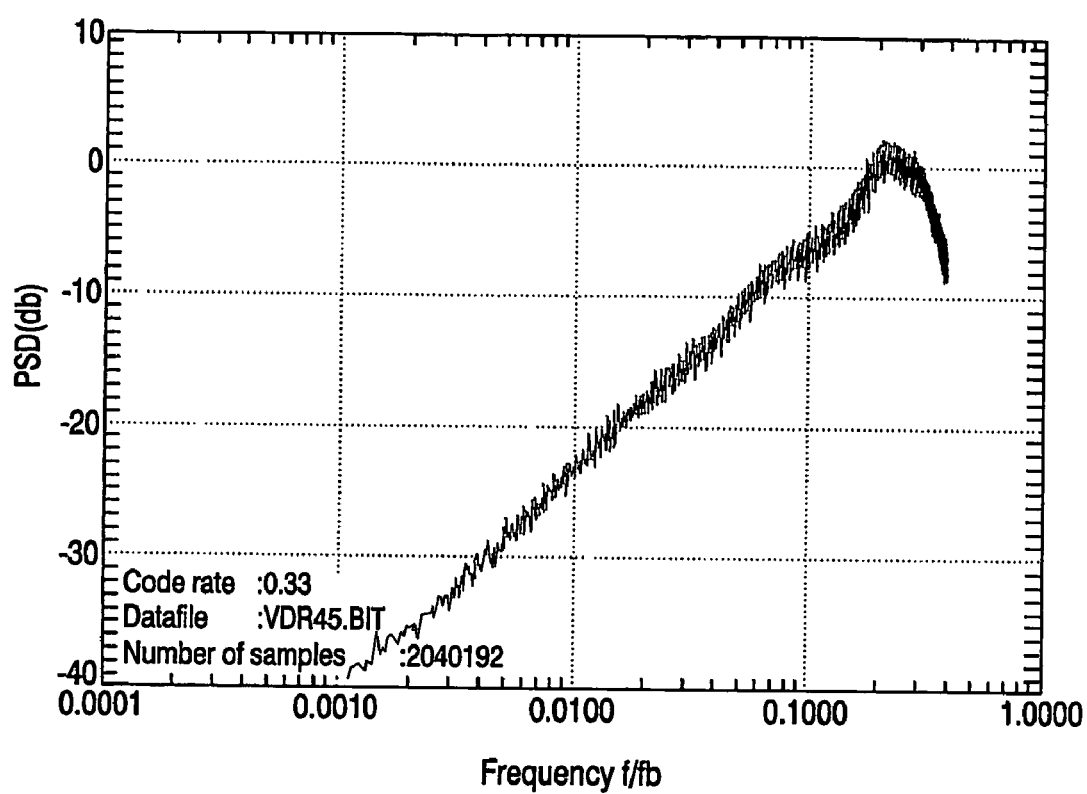
FIG. 8 shows the spectral content of the code words when precoding the input words before coding with the 17PP coder.

FIG. 8 shows the spectral content of the code words when pre-coding the input words before coding with the 17PP coder.

The pre-coding achieves a notably lower DC content by the pre-coding by ensuring that the running digital sum of each group of N code words equals zero. This lowers the absolute value of the RDS and as a consequence it also lowers the DC content. Furthermore because the data rate is increased the entire power spectral density is moved towards higher frequencies. Both effects of the pre-coding would alone already reduce the DC content, but the combined effect greatly reduces the DC content.

Figure 9:
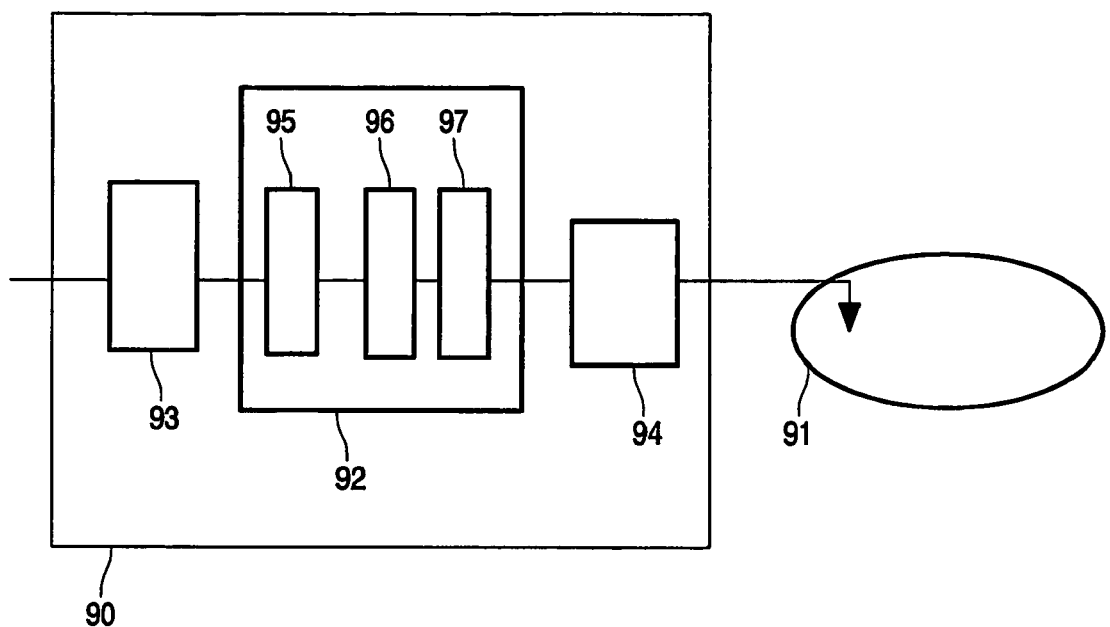
FIG. 9 shows an apparatus for storing data on a storage medium.

FIG. 9 shows an apparatus for storing data on a storage medium. The apparatus 90 for storing data on a storage medium 91 receives data comprising a stream of input words on its input and provides this stream of input words to a receiving section where signal conditioning is performed and the stream of input words can be processed to determine for instance storage location or storage method.

The receiving section 93 then provides the stream of input words to the encoder 92. The encoder 92 comprises the error correction coder 95, the pre-coder 96 and the 17PP coder 97, working as described in FIG. 1. The resulting code words as generated by the 17PP coder 97 are provided to the bit engine 94. The bit engine 94 provides the means to store the code words on the storage medium 91. For clarity reasons the optional high pass filter is not shown in FIG. 9 but would be inserted between the output of the 17PP coder 97 and the input of the bit engine 94.

Figure 10:
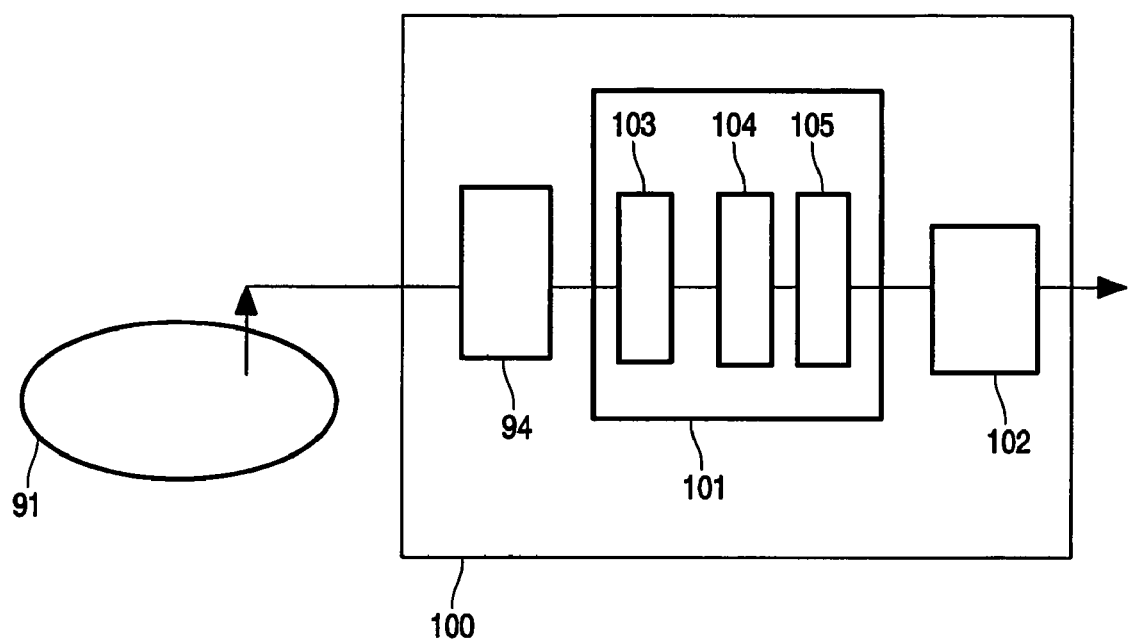
FIG. 10 shows an apparatus for retrieving data from a storage medium.

FIG. 10 shows an apparatus for retrieving data from a storage medium.

The apparatus 100 for retrieving data from a storage medium 91 comprises a bit engine 94 for retrieving the code words from the storage medium 91. The bit engine provides the code words to the decoder 101. The decoder 101 comprises the 17PP decoder 103, the pre-coding decoder 104 and the error correction code decoder 105. The decoder 101 works as described in FIG. 2. The resulting stream of data words is then provided by the decoder 101 to the processing section 102 where the data can be further processed before being provided to the output of the apparatus 100.

Figure 11:
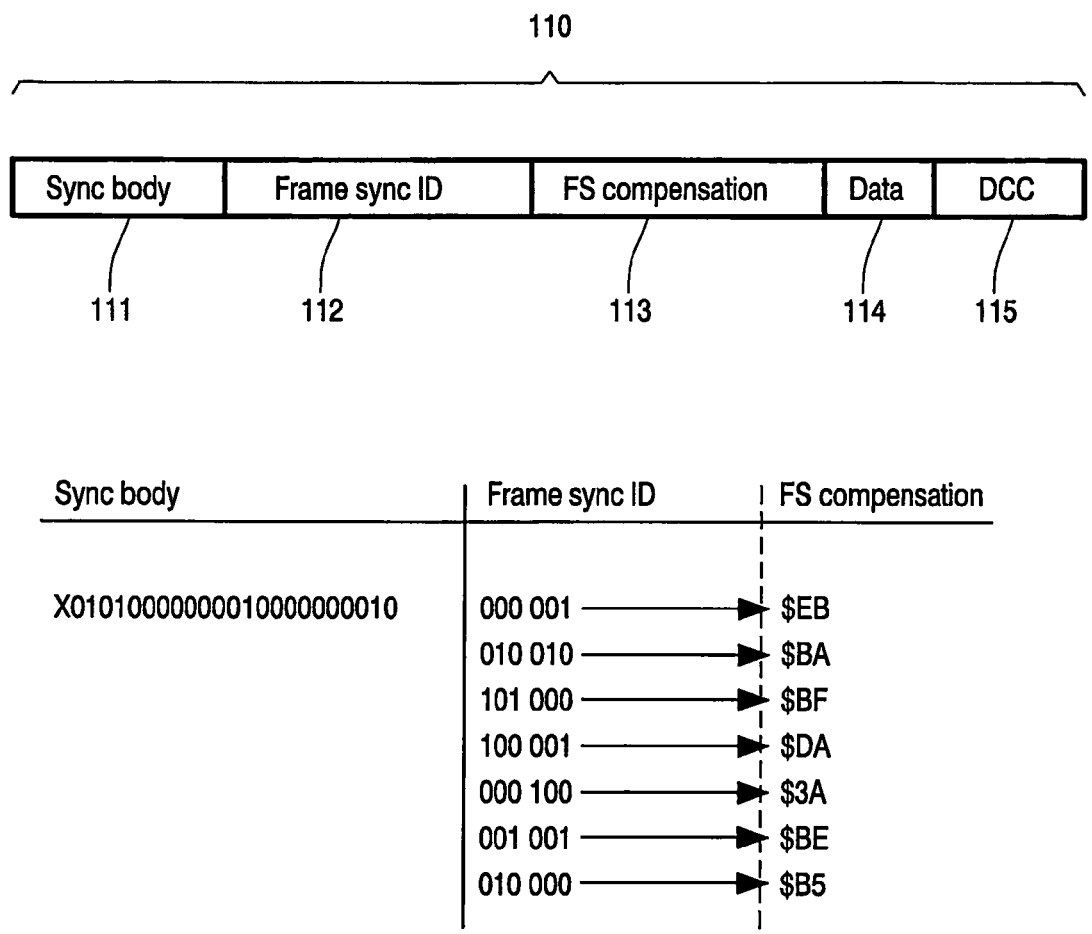
FIG. 11 shows the compensation of the RDS of the sync pattern.

FIG. 11 shows the compensation of the RDS of the frame sync pattern.

The recording frame 110 comprises a frame sync body 111 which can be chosen from two variations depending on whether the last bits before the frame sync body are encoded according to the termination table of the 17PP code as detailed in U.S. Pat. No. 6,496,541.

Each variation of the frame sync body has a different disparity.

At the output of the 17PP coder the two variations of the frame sync bodies are:

| Last bit before Frame sync body | Frame sync body (NRZ) |
|---|---|
| encoded according to termination table | 001 010 000 000 010 000 000 010 |
| not encoded according to termination table | 101 010 000 000 010 000 000 010 |

Thus the encoding of the last bits before the frame sync body determines which variation of the frame sync body will be inserted.

The frame sync body is then converted to NRZI along with the output of the 17PP coder.

This results in (assuming the last bit before the frame sync body in NRZI is '0'):

| Frame sync body (NRZ) | Frame Sync body (NRZI) | Disparity |
|---|---|---|
| 001 010 000 000 010 000 000 010 -> | 001 100 000 000 011 111 111 100 | −2 |
| 101 010 000 000 010 000 000 010 -> | 110 011 111 111 100 000 000 011 | +2 |

The listed disparity of the NRZI Frame sync body will add to the RDS which is undesirable.

In addition to the frame sync body 111 the recording frame 110 further comprises, appended to the frame sync body 111, a frame sync ID 112, a frame sync balancing word 113 and a user data section 114. The frame sync ID 112 allows the identification of the frame sync.

The frame sync ID can be chosen from the following table:

| Name | NRZ |
|---|---|
| FS0 | 000 001 |
| FS1 | 010 010 |
| FS2 | 101 000 |
| FS3 | 100 001 |
| FS4 | 000 100 |
| FS5 | 001 001 |
| FS6 | 010 000 |
| FS7 | 100 101 |
| FS8 | 101 010 |

When appended to the frame sync body and converted to NRZI this results in:

For Frame sync body (in NRZI) 001100 000 000 01111 1111 100:

| | Frame Sync ID (NRZI) | Disparity Frame sync body + Frame sync ID |
|---|---|---|
| FS0 | 000 001 | −6 |
| FS1 | 011 100 | −2 |
| FS2 | 110 000 | −4 |
| FS3 | 111 110 | +2 |
| FS4 | 000 111 | −2 |
| FS5 | 001 110 | −2 |
| FS6 | 011 111 | +2 |
| FS7 | 111 001 | 0 |
| FS8 | 110 011 | 0 |

For Frame sync body (in NRZI) 110011 111 111 100000000011:

| | Frame Sync ID (NRZI) | Disparity Frame sync body + Frame sync ID |
|---|---|---|
| FS0 | 111 110 | +6 |
| FS1 | 100 011 | +2 |
| FS2 | 001 111 | +4 |
| FS3 | 000 001 | −2 |
| FS4 | 111 000 | +2 |
| FS5 | 110 001 | +2 |
| FS6 | 100 000 | −2 |
| FS7 | 000 110 | 0 |
| FS8 | 001 100 | 0 |

When the frame sync ID is appended to the frame sync body the resulting frame sync will in most cases have a non-zero disparity as shown in the two tables above, i.e. the frame sync body with the frame sync ID appended will add to the RDS and thus introduce unwanted DC content into the signal.

For instance, when the frame sync ID FS0 000 001 (NRZ) is appended to the frame sync body 101 010 000 000 010 000 000 010 (NRZ), the resulting frame sync in NRZI will have a disparity of +6 if the bit preceding the frame sync body in NRZI is '0'. Such a large contribution to the RDS is undesirable.

The 17PP coder together with the 2→4 precoding previously described will limit the RDS and thus the DC content of the code words. The frame sync body with the appended frame sync ID however introduces DC content.

To limit the DC content introduced by the frame sync body with the appended frame sync ID, a frame sync balancing word is appended to the frame sync ID. The frame sync thus comprises subsequently the frame sync body, the frame sync ID and the frame sync balancing word.

Since there is a strict one to one relationship between the frame sync ID and the frame sync balancing word, the frame sync ID with the frame sync balancing word appended can be considered a frame sync ID as well. In the tables the frame sync balancing word is in that case directly appended to the frame sync ID, resulting in a single frame sync extension that inherently balances the frame sync body, resulting in an overall RDS of the frame sync of zero. The frame sync extension thus comprises the frame sync ID and the frame sync balancing word.

The frame sync balancing word is chosen from the following table based:

| Frame sync ID | Frame sync balancing word (NRZ) |
|---|---|
| FS0 | 000 001 001 000 |
| FS1 | 001 000 001 001 |
| FS2 | 001 000 101 000 |
| FS3 | 000 010 001 001 |
| FS4 | 010 100 001 001 |
| FS5 | 001 000 101 001 |
| FS6 | 001 000 010 010 |
| FS7 | No word is added, data follows the Frame Sync ID, 17PP encoding |
| FS8 | No word is added, data follows the Frame Sync ID, 17PP encoding |

When converting the Frame sync balancing word to NRZI when appended to the frame sync ID, the following frame sync balancing words with the listed disparities result when the last bit of the NRZI encoded frame sync body is '0':

| Frame sync ID | Frame sync balancing word (NRZI) | Disparity |
|---|---|---|
| FS0: | 111 110 001 111 | +6 |
| FS1: | 001 111 110 001 | +2 |
| FS2: | 001 111 001 111 | +4 |
| FS3: | 000 011 110 001 | −2 |
| FS4: | 100 111 110 001 | +2 |
| FS5: | 001 111 001 110 | +2 |
| FS6: | 110 000 011 100 | −2 |
| FS7: | 17PP encoded data word | |
| FS8: | 17PP encoded data word | |

When the last bit of the NRZI encoded frame sync ID is '1':

| Frame sync ID | Frame sync balancing word (NRZI) | Disparity |
|---|---|---|
| FS0: | 000 001 110 000 | −6 |
| FS1: | 110 000 001 110 | −2 |
| FS2: | 110 000 110 000 | −4 |
| FS3: | 111 100 001 110 | +2 |
| FS4: | 011 000 001 110 | −2 |
| FS5: | 110 000 110 001 | −2 |
| FS6: | 001 111 100 011 | +2 |
| FS7: | 17PP encoded data word | |
| FS8: | 17PP encoded data word | |

Some examples will help to clarify the principle of the frame sync balancing word.

1) Assuming the bit before the frame sync in NRZI is '0':
Frame sync body (NRZ): 001 010 000 000 010 000 000 010
Frame sync body (NRZI): 001 100 000 000 011 111 111 100 (disparity: −2)

To this the frame sync ID is appended, for example FS2:

| Frame sync body (NRZ) | Frame sync ID (NRZ) |
|---|---|
| 001 010 000 000 010 000 000 010 | 101 000 |

When converted to NRZI this becomes

| Frame sync body (NRZI) | Frame sync ID (NRZI) | |
|---|---|---|
| 001 100 000 000 011 111 111 100 | 110 000 | (disparity: −4) |

To balance the RDS the frame sync balancing word (NRZ) for FS2 is added to this:

| FS body (NRZ) | FS ID (NRZ) | FS balancing word (NRZ) |
|---|---|---|
| 001 010 000 000 010 000 000 010 | 101 000 | 001 000 101 000 |

When converted to NRZI this becomes

| FS body (NRZI) | FS ID (NRZI) | FS balancing word (NRZI) |
|---|---|---|
| 001 100 000 000 011 111 111 100 | 110 000 | 001 111 001 111 |

The disparity of 001 100 000 000 011 111 111 100 110 000 001 111 001 111 equals zero, so the frame sync body with the frame sync ID and the frame sync balancing word no longer contributes to the RDS. Because the data already is tightly controlled by the pre-coding and the 17PP coding the total channel data, consisting of the code words and the frame syncs, also has a very low DC content. The frame sync extension in this example is the frame sync ID with the frame sync balancing word appended: 110 000 001 111 001 111 in NRZI.

2) Assuming the bit before the frame sync in NRZI is '0':
Frame sync body (NRZ): 101 010 000 000 010 000 000 010
Frame sync body (NRZI): 110 011 111 111 100 000 000 011 (disparity: +2)

To this the frame sync ID is appended, for example FS0:

| Frame sync body (NRZ) | Frame sync ID (NRZ) |
|---|---|
| 101 010 000 000 010 000 000 010 | 000 001 |

When converted to NRZI this becomes

| Frame sync body (NRZI) | Frame sync ID (NRZI) | |
|---|---|---|
| 110 011 111 111 100 000 000 011 | 111 110 | (disparity: +6) |

To balance the RDS the frame sync balancing word (NRZ) for FS0 is added to this:

| FS body (NRZ) | FS ID (NRZ) | FS balancing word (NRZ) |
|---|---|---|
| 101 010 000 000 010 000 000 010 | 000 001 | 000 001 001 000 |

When converted to NRZI this becomes

| FS body (NRZI) | FS ID (NRZI) | FS balancing word (NRZI) |
|---|---|---|
| 110 011 111 111 100 000 000 011 | 111 110 | 000 001 110 000 |

The disparity of 110 011 111 111 100 000 000 011 111 110 000 001 110 000 equals zero, so the frame sync body with the frame sync ID and the frame sync balancing word no longer contributes to the RDS. This is because the FS balancing word 111 110 001 111 has a disparity of −6 while the frame sync plus frame sync ID have a disparity of +6, thus canceling each other. Because the data already is tightly controlled by the pre-coding and the 17PP coding the total channel data, consisting of the code words and the frame syncs, also has a very low DC content. The frame sync extension in this example is the frame sync ID with the frame sync balancing word appended: 111 110 000 001 110 000.

3) Assuming the bit before the frame sync in NRZI is '0':
Frame sync body (NRZ): 001 010 000 000 010 000 000 010
Frame sync body (NRZI): 001 100 000 000 011 111 111 100 (disparity: −2)

To this the frame sync ID is appended, for example FS0:

| Frame sync body (NRZ) | Frame sync ID (NRZ) |
|---|---|
| 001 010 000 000 010 000 000 010 | 000 001 |

When converted to NRZI this becomes

| Frame sync body (NRZI) | Frame sync ID (NRZI) | |
|---|---|---|
| 001 100 000 000 011 111 111 100 | 000 001 | (disparity: −6) |

To balance the RDS the frame sync balancing word (NRZ) for FS0 is added to this:

| FS body (NRZ) | FS ID (NRZ) | FS balancing word (NRZ) |
|---|---|---|
| 001 010 000 000 010 000 000 010 | 000 001 | 000 001 001 000 |

When converted to NRZI this becomes

| FS body (NRZI) | FS ID (NRZI) | FS balancing word (NRZI) |
|---|---|---|
| 001 100 000 000 011 111 111 100 | 000 001 | 111 110 001 111 |

The disparity of 001 100 000 000 011 111 111 100 000 001 111 110 001 111 equals zero, so the frame sync body with the frame sync ID and the frame sync balancing word no longer contributes to the RDS. This is because the FS balancing word 111 110 001 111 has a disparity of +6 while the frame sync plus frame sync ID have a disparity of −6, thus canceling each other. Because the data already is tightly controlled by the pre-coding and the 17PP coding the total channel data, consisting of the code words and the frame syncs, also has a very low DC content The frame sync extension in this example is the frame sync ID with the frame sync balancing word appended: 000 001 111 110 001 111 in NRZI.

4) The last example will show why for frame sync IDs FS7 and FS8 no frame sync balancing word is required. It will be illustrated for frame sync ID FS7 but applies equally to FS8.

Assuming the bit before the frame sync in NRZI is '0':
Frame sync body (NRZ): 001 010 000 000 010 000 000 010
Frame syncbody (NRZI): 001 100 000 000 001 111 111 100 (disparity: −2)

To this the frame sync ID is appended, for example FS7:

| Frame sync body (NRZ) | Frame sync ID (NRZ) |
|---|---|
| 001 010 000 000 010 000 000 010 | 100 101 |

When converted to NRZI this becomes

| Frame sync body (NRZI) | Frame sync ID (NRZI) | |
|---|---|---|
| 001 100 000 000 011 111 111 100 | 111 001 | (disparity: 0) |

Because the frame sync body with frame sync ID FS7 appended has a combined disparity of exactly zero no further frame sync balancing word needs to be appended.

There are two alternatives.
a Frame Sync balancing word with a disparity of zero is appended This allows the decoding to treat the Frame sync balancing word position the same regardless of the frame sync ID. This results in a less complex decoding
17PP coded code words comprising pre-coded user data is appended.

This requires the decoder to distinguish between a frame sync with frame sync ID FS0 to FS6 and a frame sync with a frame sync ID FS7 or FS8.

In case a frame sync with frame sync ID FS0 to FS6 is encountered the decoder must discard the frame sync balancing word, while when a frame sync with a frame sync ID FS7 or FS8 is encountered, the frame sync balancing word position is occupied by a code word which must not be discarded but must be forwarded to the 17PP decoder.

When the frame sync balancing word's position is used for user data the following situation results:

| Frame sync body (NRZ) | Frame sync ID (NRZ) | Code word |
|---|---|---|
| 001 010 000 000 010 000 000 010 | 100 101 | xxx xxx xxx xxx | where xxx xxx xxx xxx denotes a code word obtained from user data by pre-coding and 17PP encoding. The code word xxx xxx xxx xxx has a disparity of 0 because it passed through the 2-4 pre-coder and the 17PP coder.

The disparity of 001 100 000 000 011 111 111 100 111 001 xxx xxx xxx xxx equals zero, so the frame sync body with the frame sync ID and the code word does not contribute to the RDS. This is because the code word obtained from the user data xxx xxx xxx xxx has a disparity of 0 and the frame sync body plus frame sync ID have a disparity of 0 add up to zero. Because the data already is tightly controlled by the pre-coding and the 17PP coding the total channel data, consisting of the code words and the frame syncs, also has a very low DC content the overall recording frame 110 also has a low DC content. The frame sync extension in this example is the frame sync ID with the frame sync balancing word appended: 111 001, which is 12 bits shorter than in the first 3 examples, showing the gain in storage space for code words obtained from user data.

The invention claimed is:
1. Method for coding a stream of M input words using a channel code,
comprising the steps of
selecting a frame sync extension from a group of frame sync extensions
pre-coding the stream of M input words into a stream of pre-coded input words
coding the stream of pre-coded input words into a stream of groups of N code words using a coder
inserting a frame sync body directly in a fixed length frame in the stream of groups of N code words
arranging for a group of code words representing the frame sync extension in the stream of groups of N code words directly adjacent to the inserted frame sync body where, after a further NRZI coding, a disparity of the frame sync body is balanced by a disparity of the group of code words representing the frame sync extension, characterized in that a length of the group of code words representing the frame sync extension is variable.

2. Method as claimed in claim 1, characterized in that the coder is a 17PP coder.

3. Method as claimed in claim 1, characterized in that the coder is an EFM coder.

4. Method as claimed in claim 1, characterized in that the coder is an EFM+coder.

5. Method as claimed in claim 1, characterized in that the step of arranging for the group of code words representing the frame sync extension in the stream of groups of N code words comprises the step of inserting a frame sync balancing input word into the stream pre-coded input words.

6. Method as claimed in claim 1, characterized in that the step of arranging for the group of code words representing the frame sync extension in the stream of groups of N code words comprises the step of inserting a code word representing the frame sync extension into the stream of groups of N code words.

7. Method as claimed in claim 6, characterized in that the group of code words representing the frame sync extension in the stream of groups of N code words is chosen from the following table:

|     | Frame Sync extension |
| --- | --- |
| FS0 | 000 001 000 001 001 000 |
| FS1 | 010 010 001 000 001 001 |
| FS2 | 101 000 001 000 101 000 |
| FS3 | 100 001 000 010 001 001 |
| FS4 | 000 100 010 100 001 001 |
| FS5 | 001 001 001 000 101 001 |
| FS6 | 010 000 001 000 010 010 |
| FS7 | 100 101 |
| FS8 | 101 010 |

8. Method as claimed in claim 5, characterized in that a first sub group of code words representing a first section of the frame sync extension in the stream is chosen from the following table:

|     | first section of frame sync extension |
| --- | --- |
| FS0 | 000 001 |
| FS1 | 010 010 |
| FS2 | 101 000 |
| FS3 | 100 001 |
| FS4 | 000 100 |
| FS5 | 001 001 |
| FS6 | 010 000 |
| FS7 | 100 101 |
| FS8 | 101 010 | and that a frame sync balancing input word is chosen from the following table:

|     | frame sync balancing input word |
| --- | --- |
| FS0 | 11 10 10 11 |
| FS1 | 10 11 10 10 |
| FS2 | 10 11 11 11 |
| FS3 | 11 01 10 10 |
| FS4 | 00 11 10 10 |
| FS5 | 10 11 11 10 |
| FS6 | 10 11 01 01 |
| FS7 | none |
| FS8 | none |

9. Record carrier for storing a stream comprising code words derived from input words using a channel code and further comprising a frame sync comprising a frame sync extension, the frame sync extension comprising a frame sync identification and a frame sync balancing word where a disparity of the frame sync is zero, characterized in that a length of the frame sync extension is variable.

10. Record carrier as claimed in claim 9, characterized in that the channel code is a 17PP code.

11. Record carrier as claimed in claim 9, characterized in that the channel code is an EFM code.

12. Record carrier as claimed in claim 9, characterized in that the channel code is an EFM+code.

13. Method as claimed in claim 9, characterized in that the group of code words representing the frame sync extension in the stream is chosen from the following table:

|     | Frame Sync extension |
| --- | --- |
| FS0 | 000 001 000 001 001 000 |
| FS1 | 010 010 001 000 001 001 |
| FS2 | 101 000 001 000 101 000 |
| FS3 | 100 001 000 010 001 001 |
| FS4 | 000 100 010 100 001 001 |
| FS5 | 001 001 001 000 101 001 |
| FS6 | 010 000 001 000 010 010 |
| FS7 | 100 101 |
| FS8 | 101 010 |

14. Apparatus for storing data on a recording medium comprising an encoder with an output connected to an input of a frame sync insertion means where the encoder is arranged for coding the stream of input words into a stream of code words and the insertion means is arranged for inserting a group of code words representing a frame sync body into the stream of code words, where the encoder is arranged to control an RDS of the code words and where the insertion means is arranged to insert a group of code words representing a frame sync extension with a frame sync extension disparity into the stream adjacent to the code words representing the frame sync body, where the frame sync extension disparity is chosen to cancel a disparity of the group of code words representing the frame sync body, characterized in that a length of the group of code words representing the frame sync extension is variable.

15. Apparatus for storing data on a recording medium comprising an encoder with an input and with an output connected to an input of a frame sync insertion means where the encoder is arranged for coding the stream of input words into a stream of code words and the insertion means is arranged for inserting a group of code words representing a frame sync body into the stream of code words, where the encoder is arranged to control an RDS of the code words and where the insertion means is arranged to insert a first sub group of code words representing a first section of a frame sync extension into the stream adjacent to the group of code words representing the frame sync body, and where a further insertion means is coupled to the input of the encoder, where the further insertion means is arranged to provide a frame sync balancing input word to the encoder for obtaining a second sub group of code words representing a second section of the frame sync extension at the output of the encoder, where the group of code words representing the frame sync extension comprsies the first sub group of code words representing the first section of the frame sync extension and the second sub group of code words representing the second section of the frame sync extension, and where the frame sync balancing input word is chosen to cancel a disparity of the group of code words representing the frame sync body, characterized in that a length of the group of code words representing the frame sync extension is variable.

16. Apparatus for storing data on a recording medium as claimed in claim 14, characterized in that the coder is a 17PP coder.

17. Apparatus for storing data on a recording medium as claimed in claim 14, characterized in that the coder is an EFM coder.

18. Apparatus for storing data on a recording medium as claimed in claim 14, characterized in that the coder is an EFM+coder.

19. Apparatus for storing data on a recording medium as claimed in claim 14, characterized in that a group of code words representing the frame sync extension in the stream is chosen from the following table:

|  | first section of frame sync extension |
|---|---|
| FS0 | 000 001 000 001 001 000 |
| FS1 | 010 010 001 000 001 001 |
| FS2 | 101 000 001 000 101 000 |
| FS3 | 100 001 000 010 001 001 |
| FS4 | 000 100 010 100 001 001 |
| FS5 | 001 001 001 000 101 001 |
| FS6 | 010 000 001 000 010 010 |
| FS7 | 100 101 |
| FS8 | 101 010 |

20. Apparatus for storing data on a recording medium as claimed in claim 15, characterized in that the first sub group of code words representing the first section of the frame sync extension in the stream is chosen from the following table:

|  | Frame Sync sub ID |
|---|---|
| FS0 | 000 001 |
| FS1 | 010 010 |
| FS2 | 101 000 |
| FS3 | 100 001 |
| FS4 | 000 100 |
| FS5 | 001 001 |
| FS6 | 010 000 |
| FS7 | 100 101 |
| FS8 | 101 010 | and that the frame sync balancing input word is chosen from the following table:

|  | frame sync balancing input word |
|---|---|
| FS0 | 11 10 10 11 |
| FS1 | 10 11 10 10 |
| FS2 | 10 11 11 11 |
| FS3 | 11 01 10 10 |
| FS4 | 00 11 10 10 |
| FS5 | 10 11 11 10 |
| FS6 | 10 11 01 01 |
| FS7 | none |
| FS8 | none |

* * * * *